(12) United States Patent
Gritzmacher

(10) Patent No.: US 6,415,874 B1
(45) Date of Patent: Jul. 9, 2002

(54) GARDEN AND LANDSCAPING IMPLEMENT

(76) Inventor: John Gritzmacher, 5800 NW. Skyline Blvd., Portland, OR (US) 97231

( * ) Notice: Subject to any disclaimer, the term of this patent is extended or adjusted under 35 U.S.C. 154(b) by 0 days.

(21) Appl. No.: 09/551,191

(22) Filed: Apr. 17, 2000

Related U.S. Application Data

(60) Provisional application No. 60/130,924, filed on Apr. 24, 1999.

(51) Int. Cl.$^7$ .................................................. A01B 1/00
(52) U.S. Cl. ............................... 172/371; 30/314; 7/114
(58) Field of Search .................................. 172/371, 378, 172/380, 42, 44, 41; 30/314, 171; 7/114, 116; D8/10, 11

(56) References Cited

U.S. PATENT DOCUMENTS

| | | | | |
|---|---|---|---|---|
| 1,929,128 A | * | 10/1933 | Vidmar | 172/371 |
| 2,011,062 A | * | 8/1935 | Masamitsu | 172/371 |
| 2,015,916 A | * | 10/1935 | Blocher | 172/371 |
| 3,623,556 A | * | 11/1971 | Adams | 172/380 X |
| 5,628,370 A | * | 5/1997 | Chrysler | 172/372 |

FOREIGN PATENT DOCUMENTS

| | | | | |
|---|---|---|---|---|
| CA | 593022 | * | 2/1960 | 172/371 |
| DE | 577080 | * | 12/1984 | 172/380 |
| GB | 2140661 | * | 12/1984 | 172/371 |

* cited by examiner

*Primary Examiner*—Victor Batson
(74) *Attorney, Agent, or Firm*—Bennet K. Langlotz PC; Bennet K. Langlotz

(57) ABSTRACT

A garden tool having a blade defining a blade plane and a handle connected to the blade and extending away from the blade at an angle offset from perpendicular to the blade. The blade has a leading edge extending away from the handle, and a trailing edge opposite the leading edge. The trailing edge has profile with a protruding point.

20 Claims, 1 Drawing Sheet

GARDEN AND LANDSCAPING IMPLEMENT

REFERENCE TO RELATED APPLICATION

This is a non-provisional application based on provisional application No. 60/130,924, filed Apr. 24, 1999.

BACKGROUND OF THE INVENTION

The present invention relates to gardening and landscaping implements used to prepare or cultivate earth or eradicate unwanted plants. In particular, the present invention provides a novel construction of a hoe.

A conventional hoe has a singular blade design that may be square, rectangular, triangular, or diamond in shape. Conventional hoes have a blade that lies in a single plane. The blade of the hoe is connected to a shaft that is held by the user. The edges of conventional hoes are straight.

There are drawbacks in conventional hoe designs that limit the usefulness of such hoes. For example, conventional blade designs are not optimally configured. Consequently, users expend substantial energy to pull the blade through earth or soil or plants. If the moisture content of the earth or soil is low, the used must expend even more energy. Accordingly, there is a need for an improved hoe that more easily cuts through earth and soil and unwanted plants or plant parts.

Another problem with existing hoes is that they do not afford the user very much precision in cutting through or pulling out unwanted plant material, such as weeds. This lack of precision may result in the user harming adjacent, wanted plants, such as garden flowers. Accordingly, there is a need for an improved hoe that relatively easily moves through earth and soil. Further, there is a need for a hoe that cuts through plant material easily. Still further, there is a need for a hoe that allows the user to cultivate an area with precision so that wanted plants or plant parts are not harmed.

The present invention may be used by landscaping professionals or the weekend gardener to cultivate an area. The special features of the present invention facilitate easy push or pull action that uses less energy and saves time with forward and backward motion. The instrument has features that reduce the risk of damage to wanted plants. Accordingly, the present invention overcomes the disadvantages of the prior art and provides multiple advantageous functions in a single implement.

The preferred embodiment addresses these issues by providing a garden tool having a blade defining a blade plane and a handle connected to the blade and extending away from the blade at an angle offset from perpendicular to the blade. The blade has a leading edge extending away from the handle, and a trailing edge opposite the leading edge. The trailing edge has profile with a protruding point.

DETAILED DESCRIPTION OF THE PREFERRED EMBODIMENT

The present invention may be used for weeding, edging, grading, tamping, leveling, raking, gathering, catching roots, and creating furrows for planting.

Figure 1:
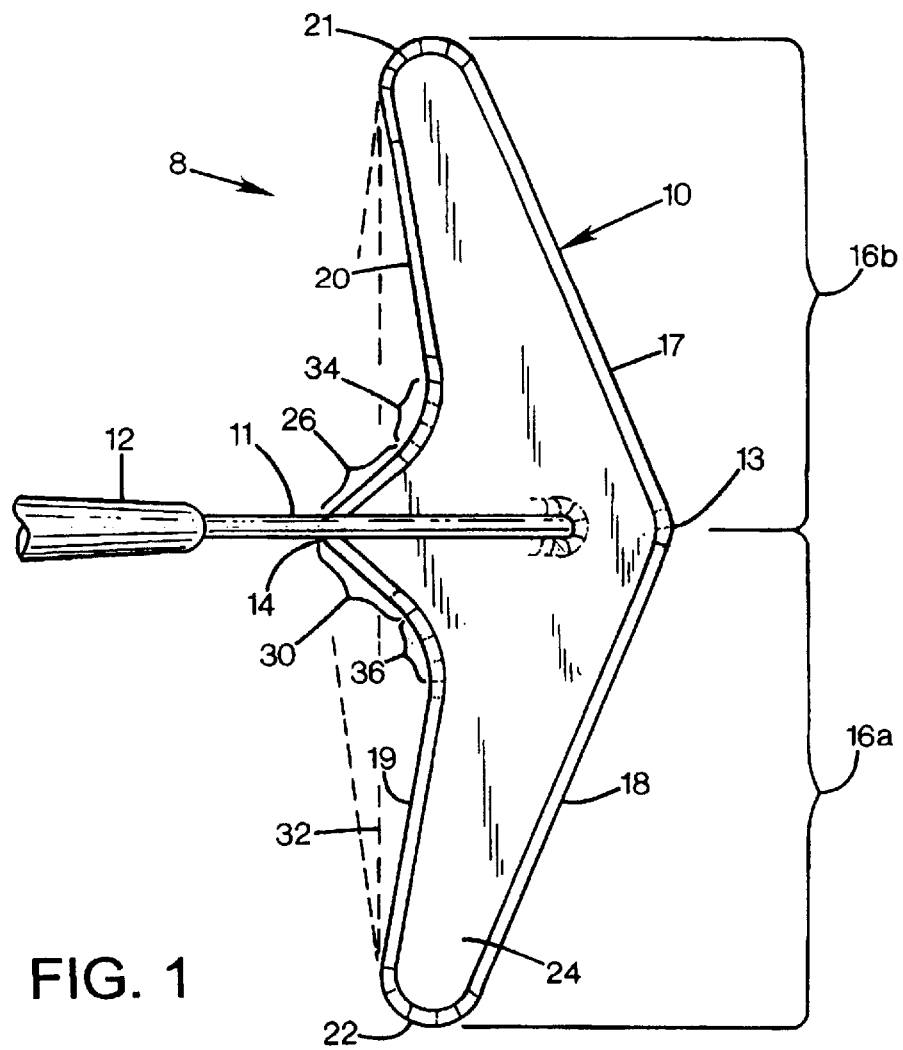
FIG. 1 shows a top view of a tool according to a preferred embodiment of the invention.

FIG. 1 shows a garden tool 8 with a planar steel blade 10. The blade has a peripheral profile in the shape of an elongated wing form, and is securely attached, preferably by welding, to a narrow elongated steel shaft 11 or a handle (not shown) affixed to the blade 10. The shaft may include a receiver 12 for receiving an elongated dowel handle of a length common to a push broom, permitting usage of the invention by a standing worker. Preferably, the blade 10 includes a point 13 in the front. Preferably, the blade 10 includes a point 14 in the rear. The points facilitate breaking of earth when pushing or pulling the instrument.

The blade comprises two laterally extending tapered wing portions, a left wing 16a and a right wing 16b. In the preferred embodiment, the two portions occupy the same plane, as both are formed from a flat metal sheet or plate. In an alternative embodiments, the wings may be angled or curved upwardly towards shaft 11 relative to a plane perpendicular to the base of shaft 11. The left wing has a straight leading edge 17 facing generally away from the direction the handle extends, and a straight training edge 20; the right wing has corresponding straight leading and training edges 18 and 19. Preferably, the end of each wing is radiused 21, 22 to provide a smooth tangential transition between the leading and training edges. Each end is a nearly semicircular arc. By avoiding sharp pointed corners at the ends, the blade may be used near plant stalks and roots with less risk of damage to desired plants.

The blade 10 has a sharpened peripheral edge about its entirety, and is ground to provide a chamfered edge 24 with a taper angle of about 30° at the upper side of the blade. The lower surface of the blade is not ground at the edge, so that it extends fully to the periphery. By sharpening only the upper side, a slight downward-burrowing bias is created so that pulling or pushing the blade through soil will tend to make it work downwardly, reducing downward force needed, and will tend to counterbalance the increasing resistance and density of deeper soil. In alternative embodiments, some of the edges may be unsharpened, such as the end portions of a blade intended for hoeing among plants with particularly delicate stalks. In all embodiments, the leading and trailing edges are the primary cutting edges, which not only facilitate movement through soil or earth, but which also cut through roots, stalks and other plant materials, and which perform other actions such as slicing, chipping, or digging. In alternative embodiments, some or all of the edges may be serrated.

The elongated wing shape of blade 10 design advantageously covers a wider path of earth than to conventional hoes of similar blade area. Instead of a conventional squarish shape, the long wingspan provides a wider swath with a limited surface area, reducing unwanted friction that would increase worker effort. The provision of front and rear points 13 and 14 gives the tool an effective forward and backward hoeing motion, so that weed cutting and tilling occurs on both strokes. The rear point has the advantage of slightly spreading the soil on the pull stroke, reducing clogging beneath the handle shaft 11.

The rear point 14 is provided by a generally straight left edge 26 and right edge, with the point being slightly radiused to about ¼". The edges of the point 14 are angled acutely to each other, slightly less than a right angle, or 82° in the preferred embodiment. This acute angle facilitates digging, and serves as a tine for hooking and lifting ropy roots and weeds from a bed. The point 14 extends rearwardly of a line 32 tangent to the rearmost portion of the free end of each wing, preferably by at least ½", and ⅝" in the preferred embodiment. As the front point 13 and swept back leading edges 17, 18 provide stability when plowing on the push stroke, the protruding and extending rear point does the same. The leading edges are swept back by 22.5° on each side so that they are at a 45° angle from each other. The trailing edges are swept back by 10° on each side, so that they include an angle of 160°. Consequently, each wing has a taper of about 12.5°.

With the rear point protruding as shown, a concave peripheral pocket is formed on either side of the point, each pocket defined by the area encompassed by an imaginary line tangent to the point and to a rear portion of the free end of the wing. In this pocket on each side, weed stalks are trapped, and not pushed aside on the pulling stroke. The depth of each pocket is about 1". Concavely radiused transitions 34, 36 between the straight trailing edges 19, 20 and the corresponding point edges 30, 26 particularly capture and cut weed stalks, and have a radius of about 1⅛ in the preferred embodiment. The rear point 14 protrudes 1¼" from a line tangent to both radiuses 34, 36, providing the advantages noted above.

Figure 2:
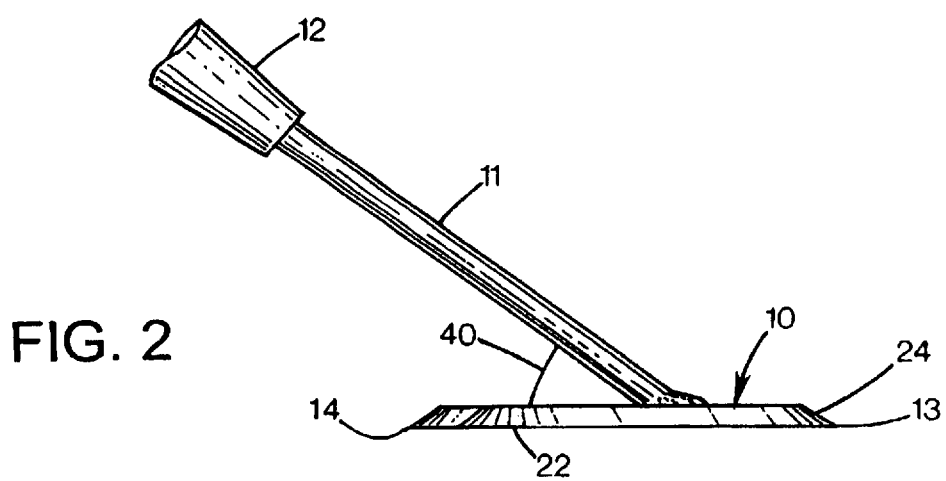
FIG. 2 shows a side view of the embodiment of FIG. 1.

As shown in FIG. 2, the blade 10 is at an angle offset from the perpendicular from the shaft axis. The shaft is preferably angularly disposed from the blade by an angle 40 of about 40°. With a nearly 45° angle, reduced slightly to allow for operation with the user'hand at a lower level, and to permit more of the hoeing force to be transmitted along the handle shaft. By having the pushing and pulling as the primary actions, the inefficient chopping action required of many conventional hoes is reduced or eliminated, reducing the time and energy needed to do a given job.

The angled blade has several other advantages and uses. By rotating the handle one half turn, the blade may be positioned nearly vertically without changing the hand position on the handle, this is useful for raking, plowing or dragging soil within a garden bed (in contrast to the horizontal weed cutting motion that leaves the soil surface largely undisturbed.) The angled leading edges create a furrow in this position. By rotating the handle only 90°, a wing tip may be used for edging lawn around a flower bed, essentially creating a vertical slice into the bed. In this position, a narrow trench or furrow may be created as well. In another use, the flat blade is positioned in a horizontal plane for patting the solid surface for an even surface. The primary intended use of the tool is with the blade horizontal, and slightly below the soil surface, so that forward and rearward motion of the blade will sever roots beneath the surface without disrupting the surface.

The present invention may have the following dimensions (in inches) and configurations:

Blade: 1" to 39" length, 11" long in the preferred embodiment.
Blade: 1" to 24" width, 4" wide from tip-to-tip, wings tapering from 2" down to 1⅛" near the tips in the preferred embodiment.
Shaft: 1" to 33", 9" long in the preferred embodiment, to ensure that a wider handle attached to the shaft does not create excessive drag by contact the soil in most uses at typical hoeing depths.
Handle: 48" to 98", 60" long in the preferred embodiment.
Corners: may be rounded, pointed, squared
Blade: Serrated or straight edge; half and half; and other known configurations for slicing, cutting, chipping, digging, etc.
Handle: Plastic, fiberglass, wood, hardwood, resin/fixed or detachable/the handle being directly attached to the blade or indirectly attached by means of a handle receiver for coupling the handle to the blade, or to a shaft extending from the blade.

With reference to FIG. 1, in one preferred embodiment for gardening vegetable beds, for example, the length "L" of the blade is about 11" and the width "W" is about 4", with a shaft 11 of about 9". The ratio of L/W is about 2.8. In a primary alternative embodiment intended for smaller tasks such as annual flower beds, the length "L" of the blade is about 6.5" and the width "W" is about 3.5", with a shaft of about 9". The ratio of L/W is about 1.8.

The present invention may be constructed using conventional means including, all types of welding, nuts and bolts, screws, rivets, nails and other fasteners, and chemical bonding.

While the above is described in terms of a preferred embodiment, the following claims are not intended to be so limited.

What is claimed is:

1. A garden tool comprising:
   a blade defining a blade plane;
   a handle connected to the blade and extending away from the blade at an angle offset from perpendicular to the blade;
   the blade having a leading edge extending away from the handle and having swept back straight edge portions, each angularly offset in a rearward direction from the perpendicular to a midline of the blade, and defining a front point at the intersection thereof;
   the blade having a trailing edge opposite the leading edge;
   the trailing edge having a profile with a protruding point between opposed straight trailing edge portions angularly offset from each other;
   the protruding point defined by angularly offset straight point edge portions; and
   each point edge portion connected to a respective trailing edge portion by a concavely radiused transition edge portion.

2. The tool of claim 1 wherein the blade has laterally extending end portions extending rearward of the concave portions.

3. The tool of claim 2 wherein the protruding point extends rearwardly of the end portions.

4. The tool of claim 1 wherein the blade is symmetrical about a midline, and wherein the trailing edge on each side of the midline includes a medial portion defining the point and angularly offset in a forward direction from the perpendicular to the midline.

5. The tool of claim 4 wherein the trailing edge includes a lateral portion beyond the medial portion, the lateral portion angularly offset in a rearward direction from the perpendicular to the midline.

6. The tool of claim 1 wherein the blade has opposed extending tapered wing portions.

7. The tool of claim 6 wherein the wing portions terminate at radiused ends.

8. The tool of claim 1 wherein the blade has a sharpened periphery.

9. The tool of claim 1 wherein the handle extends at an acute angle to the blade plane.

10. The tool of claim I wherein the blade has a leading edge profile having swept back edge portions, each angularly offset in a rearward direction from the perpendicular to a midline of the blade.

11. A garden tool comprising:
    a blade;
    a handle connected to the blade and extending away from the blade at an angle offset from perpendicular to the blade;

the blade having a leading edge having swept back straight edge portions, each angularly offset in a rearward direction from the perpendicular to a midline of the blade, and defining a front point at the intersection thereof;

the blade having a trailing edge opposite the leading edge;

the trailing edge having profile with a protruding point between opposed straight trailing edge portions angularly offset from each other;

the protruding point defined by angularly offset straight point edge portions; and each point edge portion connected to a respective trailing edge portion by a concavely radiused transition edge portion.

12. The tool of claim 11 wherein the blade has laterally extending end portions extending rearward of the concave portions.

13. The tool of claim 12 wherein the trailing edge includes a medial protruding point extending rearwardly of the end portions.

14. The tool of claim 11 wherein the trailing edge includes a protruding point between the concave portions.

15. The tool of claim 11 wherein the blade is symmetrical about a midline, and wherein the trailing edge on each side of the midline includes a medial portion defining a point and angularly offset in a forward direction from the perpendicular to the midline.

16. The tool of claim 15 wherein the trailing edge includes a lateral portion beyond the medial portion, the lateral portion angularly offset in a rearward direction from the perpendicular to the midline.

17. The tool of claim 11 wherein the blade has opposed extending tapered wing portions.

18. The tool of claim 16 wherein the wing portions terminate at radiused ends.

19. The tool of claim 11 wherein the handle extends at an acute angle to the blade.

20. The tool of claim 11 wherein the blade has a leading edge profile having swept back edge portions, each angularly offset in a rearward direction from the perpendicular to a midline of the blade.

* * * * *